US012571925B2

(12) United States Patent
Altavilla

(10) Patent No.: US 12,571,925 B2
(45) Date of Patent: Mar. 10, 2026

(54) METHOD FOR CALCULATING THE ABSOLUTE DETECTION EFFICIENCY OF THE LaBr3(Ce) SCINTILLATION DETECTOR WITH RESPECT TO A LARGE-SIZED GLASS FIBRE INSTALLED IN A HIGH VOLUME AIRBORNE SAMPLING SYSTEM

(71) Applicant: ISPETTORATO NAZIONALE PER LA SICUREZZA NUCLEARE E LA RADIOPROTEZIONE, Rome (IT)

(72) Inventor: Massimo Altavilla, Rome (IT)

( * ) Notice: Subject to any disclaimer, the term of this patent is extended or adjusted under 35 U.S.C. 154(b) by 94 days.

(21) Appl. No.: 18/687,285

(22) PCT Filed: Aug. 30, 2022

(86) PCT No.: PCT/IT2022/050239
§ 371 (c)(1),
(2) Date: Feb. 27, 2024

(87) PCT Pub. No.: WO2023/031979
PCT Pub. Date: Mar. 9, 2023

(65) Prior Publication Data
US 2024/0369721 A1 Nov. 7, 2024

(30) Foreign Application Priority Data
Aug. 31, 2021 (IT) ........................ 102021000022559

(51) Int. Cl.
*G01T 1/20* (2006.01)
*G01T 1/36* (2006.01)
*G01T 7/02* (2006.01)

(52) U.S. Cl.
CPC ............ *G01T 1/2002* (2013.01); *G01T 1/362* (2013.01); *G01T 7/02* (2013.01)

(58) Field of Classification Search
None
See application file for complete search history.

(56) References Cited

U.S. PATENT DOCUMENTS

| | | | |
|---|---|---|---|
| 5,654,899 A | 8/1997 | Leonard | |
| 2018/0329077 A1* | 11/2018 | Robinson | ................. G01T 1/20 |

FOREIGN PATENT DOCUMENTS

| | | |
|---|---|---|
| CN | 109283568 A | 1/2019 |
| CN | 111323806 A | 6/2022 |
| ES | 2126526 A1 | 3/1999 |

OTHER PUBLICATIONS

Casanovas R et al: "Development and Calibration of a Real-Time Airborne Radioactivity Monitor Using Gamma- Ray Spectrometry on a Particulate Filter", IEEE Transactions On Nuclear Science, IEEE, USA, vol. 61, No. 2, Apr. 1, 2014 (Apr. 1, 201), pp. 727-731, XP011545188, ISSN: 0018-9499, DOI: 10.1109/TNS.2014. 2299715.

(Continued)

*Primary Examiner* — Edwin C Gunberg
(74) *Attorney, Agent, or Firm* — Thomas Joseph

(57) ABSTRACT

The method uses the Monte Carlo calculation code MCNP6.1 for:
  1) The real modelling of a LaBr$_3$(Ce) scintillation based radiation detector and a physical structure comprised of multiple sections that contain a large-sized glass fibre filter subdivided into 15 active circular areas. This structure is part of a high volume airborne particulate sampling system;
  2) maximizing the position of the LaBr$_3$(Ce) radiation detector with respect to the above-cited physical structure, in which each of the 15 active areas of the filter contributes towards the calculation of the absolute detection efficiency curve, which is necessary for the quantitative analysis of the natural and artificial radionuclides, each with their own probability of deposition of the aspirated particulate.
This method can be used mainly in automatic radiological monitoring systems that operate for the purposes of radio- (Continued)

logical/nuclear early alarm, for which the state of the art does not provide the calculation of the absolute detection efficiency with respect to the probability of deposition of the particulate on the filter and, as a result, the accurate measurement of the natural and/or anthropic radionuclides in the aspirated particulate.

1 Claim, 6 Drawing Sheets

(56)                    References Cited

OTHER PUBLICATIONS

Casanovas R. et al: "Energy and resolution calibration of Nal(TI) and LaBr3(Ce) scintillators and validation of an EGS5 Monte Carlo user code for efficiency calculations", Nuclear Instruments & Methods in Physics Research. Section A, vol. 675, Feb. 1, 2012 (Feb. 1, 2012), pp. 78-83, XP55974440, NL ISSN: 0168-9002, DOI:10. 1016/j.nima.2012.02.006.

* cited by examiner

1

2

3

4

5

0

METHOD FOR CALCULATING THE ABSOLUTE DETECTION EFFICIENCY OF THE LaBr3(Ce) SCINTILLATION DETECTOR WITH RESPECT TO A LARGE-SIZED GLASS FIBRE INSTALLED IN A HIGH VOLUME AIRBORNE SAMPLING SYSTEM

CROSS REFERENCE TO RELATED APPLICATIONS

The present application is a U.S. national stage application of PCT International Application No. PCT/IT2022/050239, filed Aug. 30, 2022, and published as PCT Publication WO/2023/031979 on Mar. 9, 2023, which claims priority to Italian Application No. 102021000022559, filed on Aug. 31, 2021. The disclosures of all the foregoing applications are hereby incorporated by reference in their entirety into the present application.

TECHNICAL SECTOR

This invention concerns a method for generating the absolute efficiency curve of a LaBr3(Ce) scintillation based radiation detector and a physical structure with respect to a large-sized glass fibre filter, subdivided into 15 active circular areas, contained inside a structure made up of multiple sections called "cassettes" [0].

The absolute efficiency curve is calculated using the Monte Carlo calculation code, which is used for modelling the LaBr3(Ce) scintillation based radiation detector and the "cassette" structure containing the absolute glass fibre filter [11].

The absolute efficiency curve is functional with respect to the LaBr3(Ce) scintillation based radiation detector, component of the high volume airborne particulate sampling system, as it permits the "quantification" of the radionuclides in terms of radiological activity (Bequerel [Bq]) deposited in the 15 circular areas of the glass fibre filter, and the subsequent determination of the airborne radioactive concentration (Bequerel/m$^3$ [Bq/m$^3$]).

The absolute efficiency curve is calculated with respect to the particulate deposited in the 15 circular areas of the filter system. Each of the 15 circular areas of the glass fibre filter contributes with its own specific probability of particulate deposition to the computation of the absolute efficiency curve.

This LaBr3(Ce) scintillation based radiation detector also permits the energy-based discrimination of the radionuclides deposited in the 15 circular areas of the glass fibre filter, with a high energy resolution that is lower than a High Purity Germanium (HpGe) radiation detector but higher than other scintillation detectors such as sodium iodide (NaI(Tl)).

THE STATE OF THE ART

As is well known, the automated stations for the sampling of high volume airborne particulate equipped with NaI(Tl) scintillation detector(s) are able to continuously monitor the particulate deposited in the 15 circular areas that make up the absolute glass fibre filter.

The i-th NaI(Tl) scintillation detector is positioned inside a PVC pipe in a longitudinal position with respect to the "cassette" structure [0] in order to minimize the "turbulence" effects generated by the other sampled air flows.

This i-th detector is not calibrated with respect to efficiency for the 15 circular areas of the glass fibre filter, but it is able to point out an alarm if a variation is found with respect to the total count rate and, thanks to the spectrometric capacity of the NaI(Tl) scintillation detector, it is also able to point out any variations in the total count rate due to radionuclides of natural or artificial origin.

The NaI(Tl) detector is not able to reach very high energy resolutions which, for example in the case of the radionuclide Cs-137 (662 keV), reach values equal to approx. 40 keV.

The use of NaI(Tl) detectors does not make it possible to obtain energy resolutions that permit the discrimination of multiple radionuclides with similar energy and, the lack of efficiency calibration with respect to the 15 circular areas of the glass fibre filter does not permit, furthermore, the quantitative analysis of the i-th natural or artificial radionuclide present in the sampled particulate; it is only possible to "estimate" the possible presence of natural or artificial radionuclides with respect to a predefined alarm threshold, which is calculated, as mentioned above, based on the total count rate.

Technical Problem to be Solved

The technical problem at the basis of this invention is to guarantee:

1) better discrimination of any radionuclides that could be present in the atmospheric particulate through the adoption of radiation detectors with higher energy resolutions, such as LaBr$_3$(Ce) scintillation based radiation detectors and, in particular, modelling it with calculation codes;

2) "maximization" of the absolute detection efficiency of the above-mentioned radiation detector with respect to the glass fibre filter, minimizing the "shield" effects due to various components making up the high volume airborne particulate sampling system and, finally positioning the said detector far from other air flows located in the central part of the glass fibre filter due to the high volumes of air aspirated by the sampling system;

3) the generation of an absolute detection efficiency curve, as a function of the probability of particulate deposition in the various areas that make up the absolute glass fibre filter in order to make the calculation of the radiological activity deposited on the filter as accurate as possible and, as a result, calculate with greater precision the presence of any contamination in the air due to the radioactive particulate to which the general public could be exposed.

[1] an upper aluminium frame measuring (252×426) mm with a thickness of 6 mm;

[2] a 1.7 mm thick EPDM (Ethylene Propylene Diene Monomer) rubber layer;

[3] a 0.5 mm thick steel layer that supports the EPDM rubber layer;

[4] a layer comprised of a 0.6 mm thick steel mesh with square mesh (1.6×1.6) mm on the side;

[5] an 8 mm thick "cassette body" aluminium support with rectangular holes with a width of 78 mm and a height of 76 mm.

Figure 2:
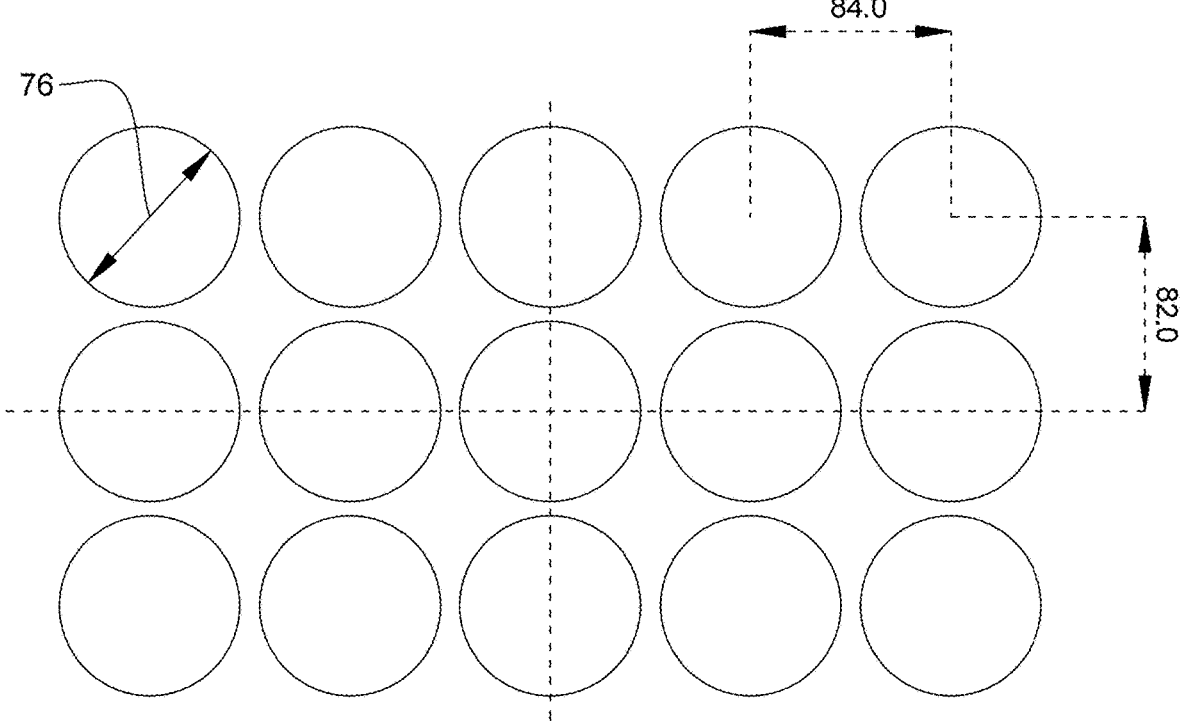

FIG. 2 provides a graphical representation of the 15 circular areas [6] located inside the absolute glass fibre filter with dimensions in mm.

Figure 3:
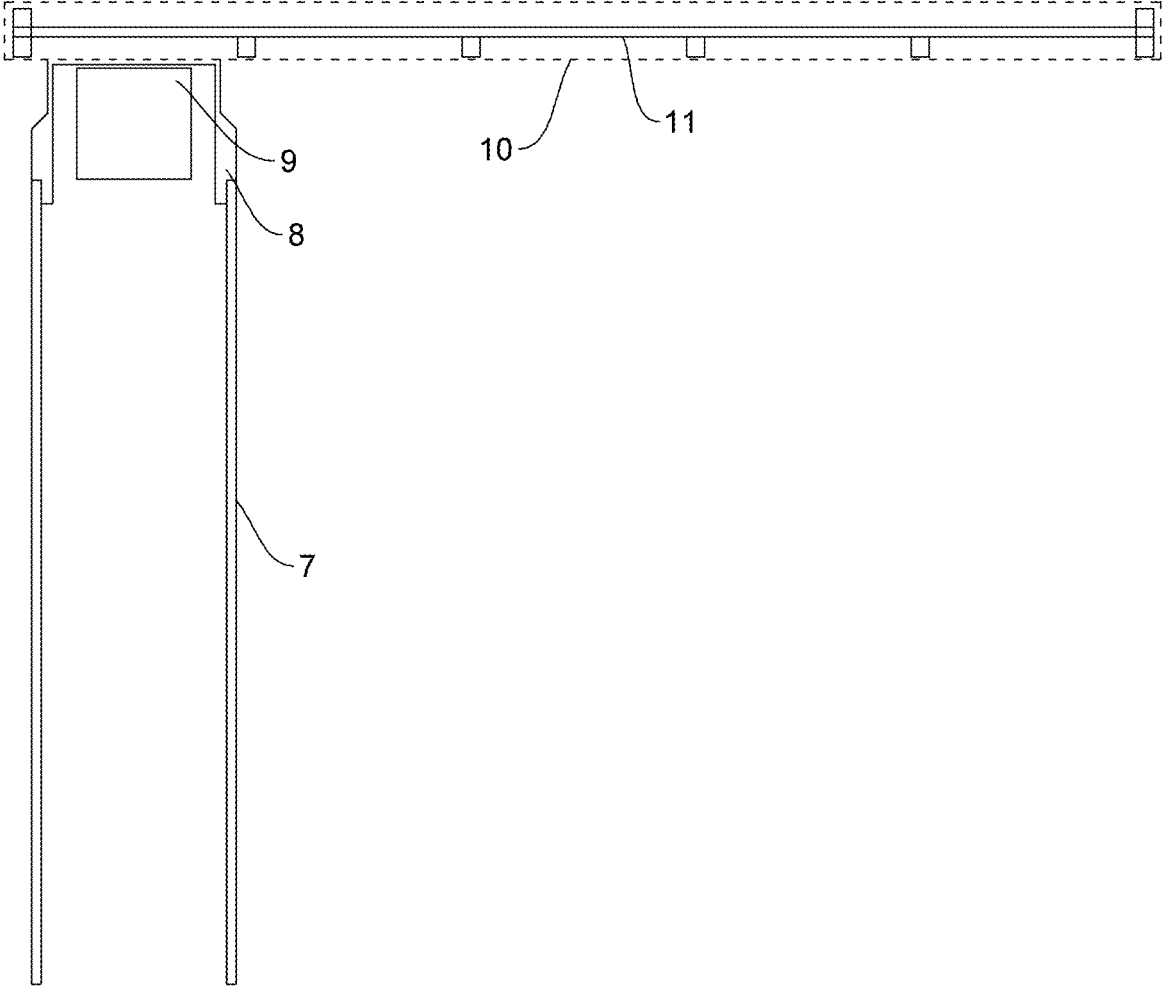
Figure 4:
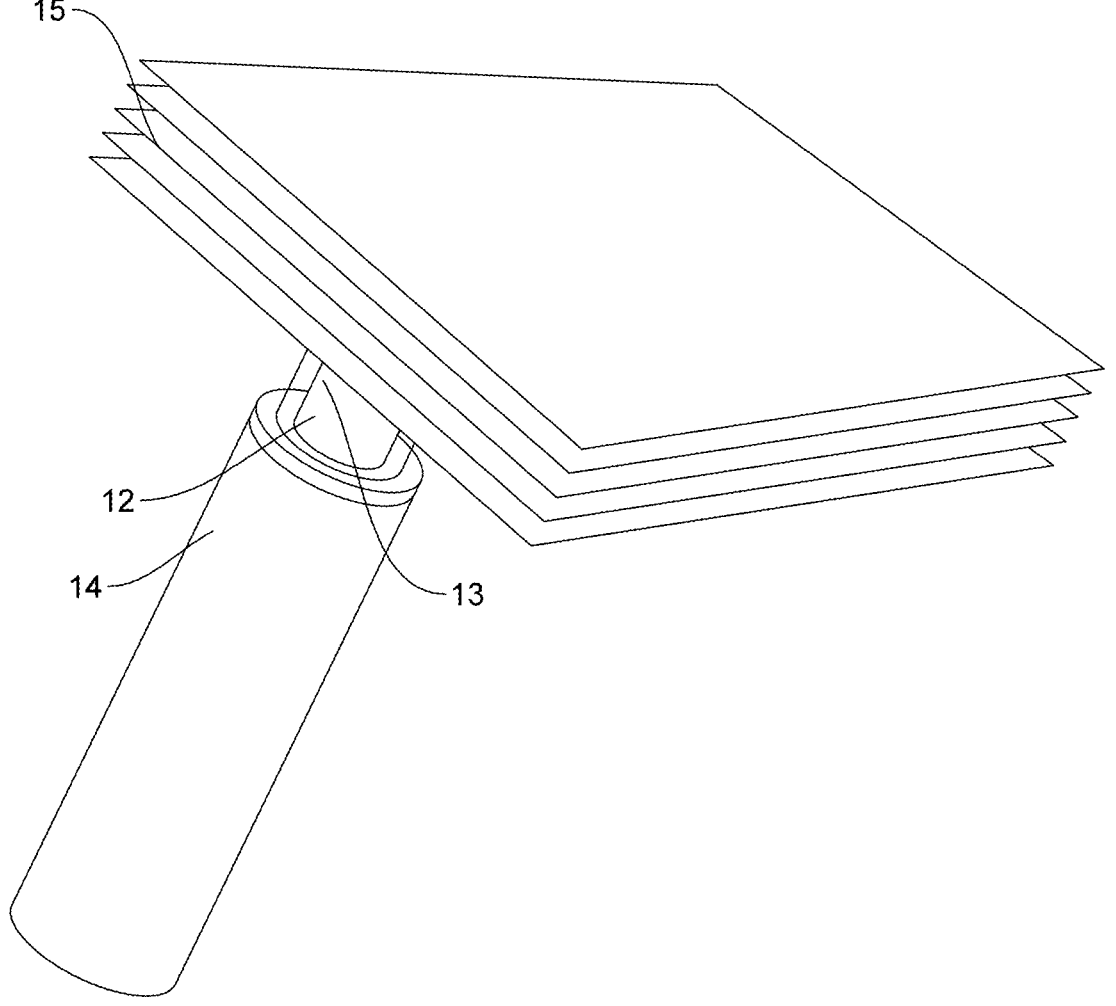

FIG. 3 indicates the position of the LaBr3(Ce) detector with respect to the filter system on the xz plane. The following components are identified with numbers 7 to 11:

[7] cylindrical structure, whose centre is placed at 16.80 cm on the x axis, symmetrically to the right or left with respect to the central position of the absolute filter, and 0.00 cm on the y axis with respect to the above central position of the filter, whose structure is comprised of a cylindrical steel container with length of 30.00 cm along the z axis, external radius of 3.81 cm and internal radius of 3.51 cm;

[8] a polyethylene cylindrical container whose function is to close the steel cylinder [7], by being screwed on top of it, with a length of 5.45 cm along the z axis, external radius of 3.80 cm and internal radius of 3.00 cm and whose distance of the upper polyethylene surface respect to the absolute glass fibre filter [11] equals 1.13 cm on the z axis, in conditions without the intake of air;

[9] the LaBr3(Ce) scintillation based radiation detector located in a central axial position with respect to the polyethylene cylindrical container [8] and the steel cylindrical container [7];

[10] the "cassette" structure, identified by the red rectangle and the number [10], also in red, which contains the glass fibre filter [11];

[11] the absolute glass fibre filter;

FIG. 4 provides a transparent 3D representation with the Monte Carlo code of the various components and sections of the "cassette" system with the LaBr3(Ce) detector in a central axial position inside the steel pipe [14] and the polyethylene cylinder [13]. Some components are described below:

[12] LaBr3(Ce) scintillation based radiation detector;

[13] polyethylene cylindrical container whose function is to close the steel cylinder [14], and which contains the LaBr3(Ce) scintillation based radiation detector [12];

[14] cylindrical container closed at its upper end by the polyethylene cylindrical container [13], which contains the LaBr3(Ce) scintillation based radiation detector [12];

[15] the "cassette" system [0] which contains the absolute glass fibre filter [11].

Figure 5:
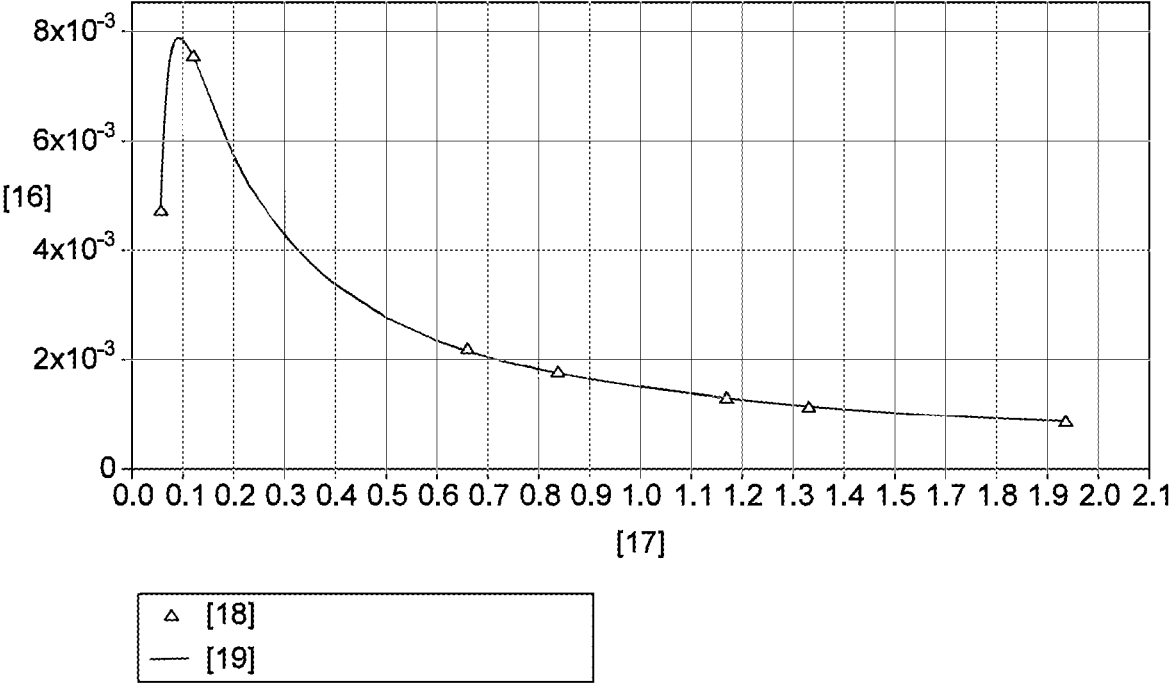

FIG. 5 shows the absolute efficiency curve generated with the Monte Carlo code in relation to a LaBr3(Ce) scintillation based radiation detector, with respect to the 15 circular areas present in the absolute glass fibre filter, into which the aeriform particulate is deposited if its probability of deposition P is equal to 1 for each of the above-mentioned circular areas. FIG. 5 also identifies the following with red numbers from to [16] to [19]:

[16] Y axis of the chart with the description "Absolute detection efficiency [ru]" with ru, relative unit;

[17] X axis of the chart with the description "Energy [MeV]";

[18] description of the "Legend" for the "absolute energy points function of the energy in MeV";

[19] description of the "Legend" for the "5th degree polynomial interpolation curve".

Figure 1:
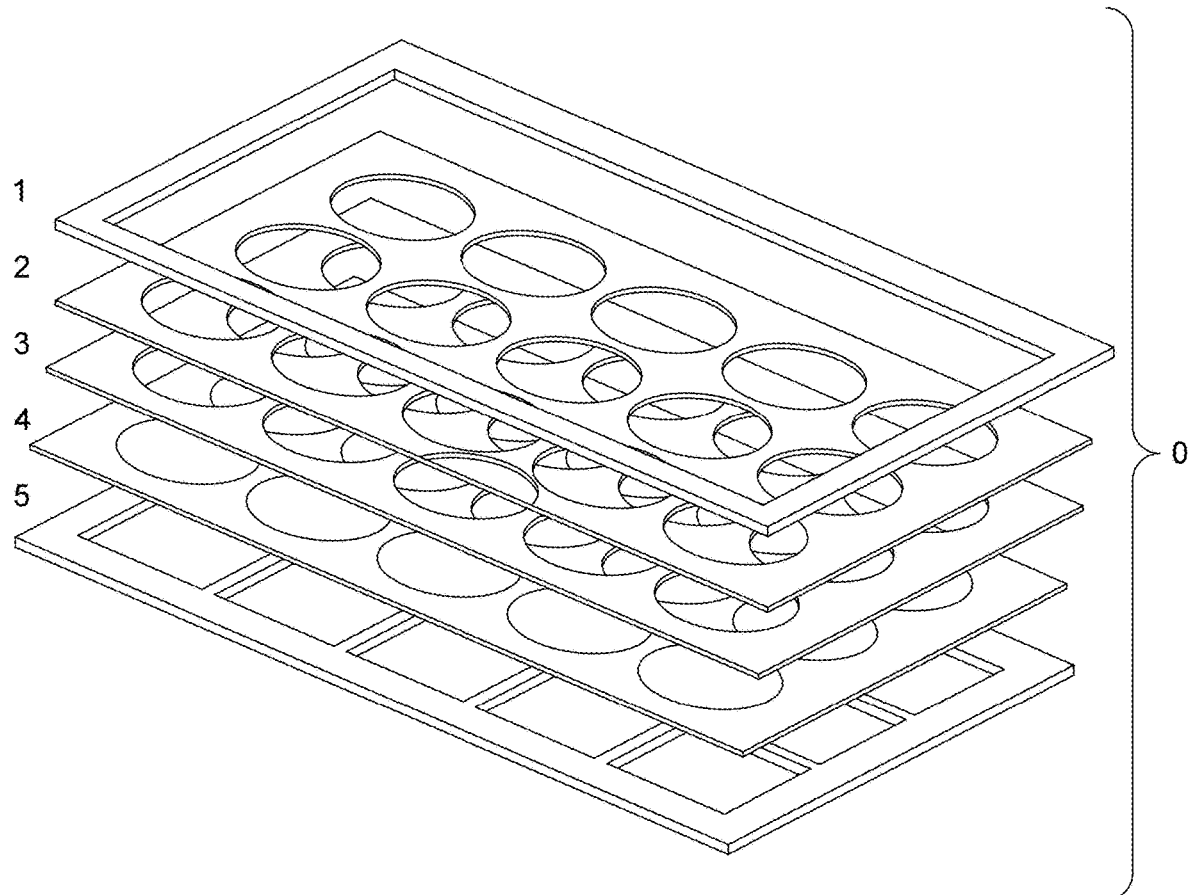
FIG. 1 shows the "cassette" structure that contains the actual glass fibre filter between the upper aluminium frame [1] and the EPDM rubber layer [2]. This system is comprised of a series of independent sectors able to both maintain the "seal" of the glass fibre filter as well as to prevent it from breaking. The "cassette" structure is comprised of the following sections, numbered from 1 to 5 from the top downward.
Figure 6:
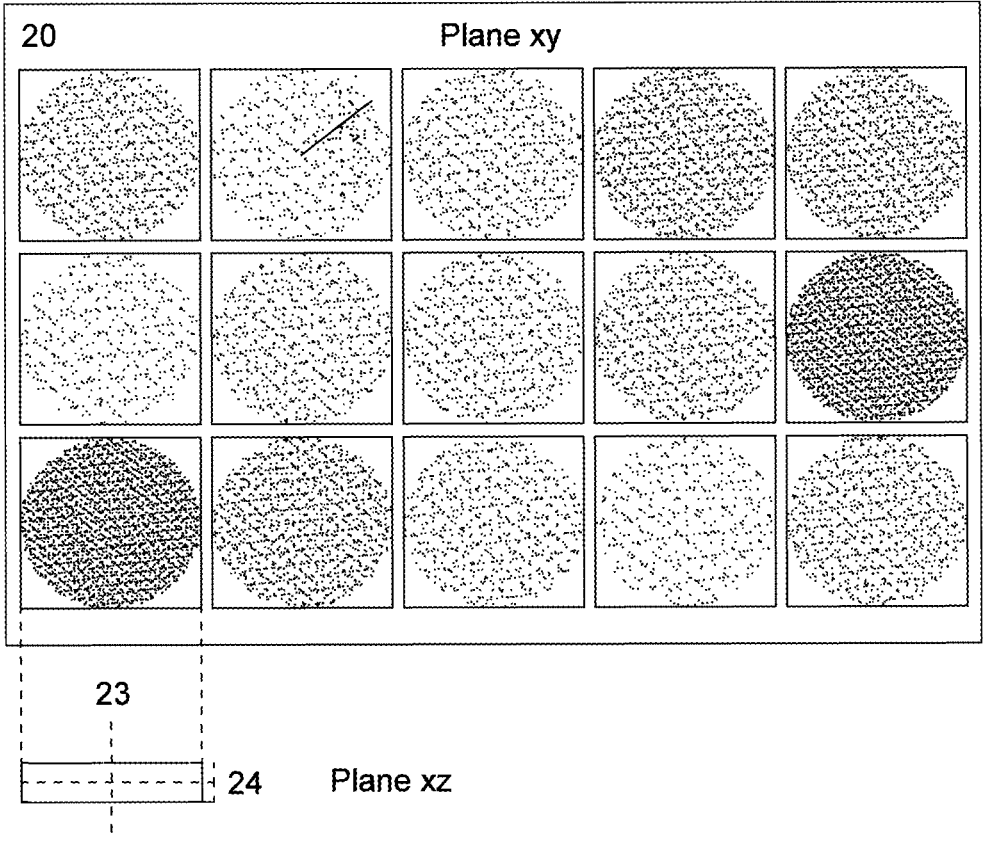

FIG. 6 shows the "cassette" structure [0] containing the absolute glass fibre filter with the 15 circular areas in which the corresponding source terms are present, each of which with a different deposition probability (indicated by a different statistical sampling density with the Monte Carlo code in blue) to indicate the different contribution with respect to the absolute glass fibre filter, in particular:

[20] aluminium support defined "cassette body" (FIG. 1 (5));

[21] i-th circular area (with i=1, . . . 15) present in the absolute glass fibre filter;

[22] radius of the i-th circular area (with i=1, . . . 15);

[23] axis of the i-th (with i=1, . . . 15) cylindrical volume, perpendicular with respect to the i-th (with i=1, . . . 15) circular area on the xy plane;

[24] thickness of the absolute glass fibre filter.

DETAILED DESCRIPTION OF THE INVENTION

The absolute glass fibre filter with dimensions of 460×285 mm is subdivided into 15 active circular areas with a diameter of 76 mm [6] and is contained in a structure comprised of multiple sections called "cassettes" [0].

The "cassette" structure is comprised of the following sections, from the top downward [0]:

[1] an upper aluminium frame measuring (252×426) mm with a thickness of 6 mm;

[2] a 1.7 mm thick EPDM (Ethylene Propylene Diene Monomer) rubber layer;

[3] a 0.5 mm thick steel layer that supports the EPDM rubber layer;

[4] a layer comprised of a 0.6 mm thick steel mesh with square mesh of (1.6×1.6) mm on the side;

[5] an 8 mm thick "cassette body" aluminium support with rectangular holes with a width of 78 mm with a height of 76 mm.

A 0.52 mm thick glass fibre filter with density of 0.16 g/cm$^3$ is positioned between the "aluminium frame" [1] and the "EPDM rubber layer" [2].

The EPDM rubber layer [2] and the steel support layer [3] have 15 circular holes with a diameter of 76 mm [6].

The high volume airborne particulate sampling system is able to guarantee airflow rates of 500 m$^3$/h.

To obtain the energy-dependent efficiency curves, it was necessary to reproduce the geometry of the radiological monitoring system in a detailed manner with the Monte Carlo code, considering only its parts that contribute or could contribute towards the definition of the above-mentioned efficiency curves. For this reason, the "cassette" system [0] was completely reproduced in all of its parts with the Monte Carlo calculation code.

For each of the above-mentioned components, also the same chemical composition was reproduced and the corresponding densities were used in order to define the corresponding cross sections.

For the majority of the components, the cross sections of reference were rather simple to reproduce, as they refer to common materials such as steel, aluminium and rubber, whereas in the case of the absolute glass fibre filter, the technical data sheet of the A500G filter manufactured by Hovoglas and commonly used in some automated high-volume airborne particulate sampling stations was used as a reference.

As regards the composition and density of the A500G filter, table 1 provides its chemical composition reproduced in the calculation code.

TABLE 1 chemical composition and percentage by weight of the individual
elements of the Hovoglas absolute glass fibre filter A500G
(filter density equal to 0.16 g/cm³ and thickness equal to 0.52 mm).

| Element | Percentage by weight |
|---------|----------------------|
| Yes | 27.6 |
| N/A | 5.9 |
| Until | 3.2 |
| Ba | 3.2 |
| Ca | 2.9 |
| B | 2.4 |
| Zn | 2.3 |
| K | 2.2 |
| Mg | 0.3 |
| S | 0.11 |
| Fe | 0.06 |
| Ti | 0.04 |
| Rb | 0.003 |
| P | |
| Cl | |
| Zr | 0.04 |
| Sr | 0.03 |
| Pb | 0.003 |
| Ce | |
| As | 0.001 |
| Th | 0.001 |
| U | 0.001 |
| C | 3.4 |
| O | 44.1 |
| Total | 97.789 |

The radiation detector to be used for the continuous measurements on the filter is a LaBr$_3$(Ce) detector, which was selected due to its energy resolutions and its measurement characteristics typical of a scintillation detector.

It must also be pointed out that at the state of the art, the energy resolution of this detector is the best available for scintillation systems and, furthermore, as an intrinsic characteristic of this detector, it operates at room temperature without the typical need of cooling an HpGe detector.

The LaBr$_3$(Ce) detector to be simulated with the Monte Carlo calculation code has physical dimensions of 3.81 cm×3.81 cm and an energy resolution, in correspondence of the energy row of Cs-137 (662 keV), equal to approx. 20 keV.

In the case of the gamma spectrometry, the efficiency calibration is particularly complex when calibration standards for large sizes or with particular geometries, such as those represented by the "cassette" system, are not available. For this reason, particular procedures are developed that have the prerogative of combining the characteristics of the detector, the physical data that describes the metallic material and the hypothesis of the distribution of the radionuclides in/on the material itself.

The absolute detection efficiency is determined based on the gamma emission energy of the concerned radionuclide, the distribution of the radionuclide(s) in the material, the absorption properties of the material and based on the detection system used as well as the distance from the emission source. The efficiency functions are determined both with a procedure that combines the results of the efficiency calibration with the calculation model, as well as with a calibration procedure that is based exclusively on a numerical calculation model.

The absolute efficiency curve of the LaBr3(Ce) scintillation based radiation detector with respect to the 15 circular areas of the absolute glass fibre filter, in which the particulate is deposited, is a function of:

1) the position of the i-th (with i=1, . . . , 15) circular area of the said filter with respect to its radiation detector;
2) the normalized deposition of the particulate, according to the formula $$z = \frac{x - \min(x)}{\max(x) - \min(x)}$$

with, min(x) representative of the minimum deposition value in the 15 circular areas of the absolute glass fibre filter, max(x), the maximum deposition value in the 15 circular areas of the said filter, x the particulate deposition value of the i-th (with i=1, . . . , 15) circular area of the absolute glass fibre filter and, z normalized particulate deposition value in the i-th (with i=1, . . . , 15) circular area of the said filter.

In particular, the calculation of the absolute efficiency curve with respect to a radiation detector is performed using a specific "counter" included in the Monte Carlo code that is able to "create" the energy distribution of the pulses inside a radiation detector.

In our case, the "counter" in reference to the gamma radiation pulses is a function of the volume within which the pulse energy distribution is to be "created", i.e. the active volume of the radiation detector [9].

The pulse energy distribution is generated by one or more source terms; in our case the source terms are defined by the particulate aspirated into the "cassette" structure [0] and held inside the 15 circular areas of an absolute glass fibre filter, located between the upper aluminium frame [1] and the EPDM rubber layer [2] making up the above-mentioned "cassette" structure [0].

The particulate is distributed inside each of the 15 circular areas [6] with a deposition probability P that depends on the position of the i-th circular area with respect to the centre of the "cassette" system [0] and, as a result, of the absolute glass fibre filter making up, therefore, 15 different source terms.

The i-th source term (with i=1, . . . , 15) is simulated with the Monte Carlo code with specific functions that, in the case of the i-th circular area [21] and thickness of the absolute glass fibre filter [24], below the said i-th circular area [21], foresee a uniform spatial distribution term in the i-th circular area (with i=1, . . . , 15) with radius C[22] and a uniform spatial distribution term with respect to the axis [23] of the above-mentioned filter thickness [24].

The energetic distribution of the pulses is therefore generated by multiple source terms, comprised of the 15 circular areas [6] [21] present in the absolute glass fibre filter and located in different positions with respect to the centre of the said filter. Each of the 15 source terms will contribute, also in function of the deposition probability of the particulate in each of the above-mentioned circular areas and the thickness of the absolute glass fibre filter below the i-th circular area [24], to the definition of the absolute efficiency curve, which is obtained from the single efficiency points [18] in function of the energy [17] interpolated with a 5th degree polynomial function through the use of a specific "counter".

The main advantage of a numerical calibration is, fundamentally, that specific radioactive calibration sources are not used, as it is based on the characteristics of the detector, the geometric model of the object or surface to be measured and, finally, on the detection efficiency calculation algorithm.

The characterization of the detector is based on a mathematical expression that describes the efficiency of the detector with respect to the punctiform sources; therefore, the characterization will depend on the gamma emission energies of reference, the distance from the detector glass and from the solid angle.

The mathematical expression of the efficiency curve is determined using specific Monte Carlo simulations by modulating the parameters of the simulation itself in order to make the simulations coincide with the actual radiometric measurements of the punctiform sources or surface sources.

The above-mentioned method for characterizing the detector defined for more complex systems such as, for example, High Purity Germanium (HpGe) detectors, is described in the scientific publication "*Development of a stochastic detection efficiency calibration procedure for studying collimation effects on a broad energy germanium detector*", Nucl. Instr. and Meth. in Phys. Res. A 712 (2013) 157-161, M. Altavilla, R. Remetti.

As previously mentioned, the Monte Carlo code makes it possible to calculate, once the detector of collimated and non-collimated radiation has been simulated, the absolute detection efficiency for any geometry, material or distance at which this geometry has been positioned.

The basic definition of absolute detection efficiency is:

$$\varepsilon_{tot} = \frac{\text{total number of photons detected at the "full} - \text{energy peak"}}{\text{total number of photons by the source}}$$

The total efficiency of a detector can be expressed as the product of 4 factors:

$$\varepsilon_{tot} = \varepsilon_{geom} \cdot \varepsilon_{abs} \cdot \varepsilon_{sample} \cdot \varepsilon_{int}.$$

The geometric efficiency $\varepsilon_{geom}$ represents the fraction of emitted photons that are intercepted by the detector. For a generic punctiform source, this is given by the following expression:

$$\varepsilon_{geom} = \frac{A}{4\pi r^2}$$

where A represents the surface of the detector intercepted by the photon, and r represents the detector—source distance. This factor is essentially independent of the photon energy and represents the inverse square law for count rates in function of the detector—source distance.

The absorption efficiency ($\varepsilon_{abs}$), on the contrary, takes into account the effects of the interposed materials (such as the detector endcap, special absorbers, etc.) that attenuate a part of the emitted radiation before it interacts inside the volume of the detector. This factor is particularly important for low-energy photons for which the absorption effects are more evident; the absorption efficiency has the following formula:

$$\varepsilon_{abs} = \exp\left[-\sum_i \mu_i(E_\gamma)\rho_i x_i\right]$$

where $\mu_i$, $\rho_i$ and $x_i$ represent, respectively, the coefficients of mass absorption, the density and thickness of the i-th interposed material and the summation is extended to all types of interposed material.

The sample efficiency $\varepsilon_{sample}$ represents the fraction of the released gammas that emerge from the material of which the sample is comprised. For example, in the case of a wall with thickness x and transmission T equal to $\exp[-(\mu\rho x)_{sample}]$, the sample efficiency is:

$$\varepsilon_{sample} = \frac{1 - \exp\left[-(\mu\rho x)_{sample}\right]}{(\mu\rho x)_{sample}} = \frac{T-1}{lnT}$$

This factor clearly depends on the composition of each sample.

The intrinsic efficiency $\varepsilon_{int}$ represents the probability that a gamma that enters the detector interacts and creates a pulse in the "full Energy peak". In more simple terms, this term derives from the standard absorption formula:

$$\varepsilon_{int} = 1 - \exp(-\mu\rho x)$$

where $\mu$ represents the photoelectric mass attenuation coefficient, and $\rho$ and x represent, respectively, the density and thickness of the sensitive detector material. This simple expression underestimates the actual intrinsic efficiency because the "full-energy peak" can also contain multiple events originating from Compton-type interactions. In general, $\varepsilon_{int}$ can also depend on a weak function of r due to the detection of off-axis incident gammas. Empirically, $\varepsilon_{int}$ can be approximated by an exponential function of the type: $\varepsilon_{int} \propto aE_\gamma^{-b}$, with constant parameters a and b and $E_\gamma$ energy of the reference gamma.

Detection efficiencies are generally measured as absolute photopeak efficiencies in reference to the gammas originating from a non-attenuated punctiform source. In any case, their energetic dependency is dominated by the factor $\varepsilon_{int}$ in the case of high energies and $\varepsilon_{abs}$ for low energies; the geometric factor $\varepsilon_{geom}$ defines the total efficiency intensity. The intrinsic and absolute efficiencies are strongly dependent on the energy of the incident photon.

The Monte Carlo method represents a very powerful tool for simulating the response of a detector and is applicable to a multitude of samples with different matrices and geometries. It can be generally defined as a method that aims to obtain an estimate of the solution of mathematical problems thanks to the use of random numbers such as those obtained, for example, when playing roulette.

The Monte Carlo method can be used to describe some theoretical statistical processes and can be particularly useful for complex problems that cannot be modelled by codes that use deterministic methods. These individual probabilistic events, that include a process, are simulated sequentially. The probability distributions that govern these events are sampled statistically to describe the complete phenomenon. In particle transport, the Monte Carlo technique consists in following each of the particles emitted by the source during their entire life cycle, until their death, in terms of absorption, diffusion or other physical interaction events. The probability distributions are sampled randomly using the transport data to determine possible developments during each interval of their life.

These techniques are very different than deterministic methods. Deterministic methods solve transport equations for the average behaviour of the particles, whereas the Monte Carlo method does not explicitly solve an equation, but is able to obtain answers by simulating the individual particles and recording some aspects of their average behaviour.

The behaviour of the particles in the physical system is then deduced (using the central limit theorem) from the average behaviour of the simulated particles.

The Monte Carlo codes are increasingly being used to simulate efficiency curves where experimental determination is impossible or difficult, such as unconventional geometries or large-sized samples such as environmental samples or waste drums where measurement standards are not easy to find. These simulation methodologies are independent of the decay patterns of individual radionuclides and, as a result, are independent of the coincidence summing corrections.

Different simulations carried out with the Monte Carlo code have made it possible to position the LaBr$_3$(Ce) detector(s) in a vertical position with respect to the "cassette" system, inside one or more polyethylene pipes located immediately below the "cassette" structure at a distance of approx. 0.05 cm from the aluminium support called the "cassette body" [5].

This selection not only "protects" the detector from the air flow but also makes it possible to "maximize" the absolute detection efficiency obtained by the single efficiency points [18] in function of the energy [17] interpolated with a 5th degree polynomial function [19].

FIG. 4 shows the 3D representation of the same system and points out the various components and sections of the "cassette" system [0] with the LaBr$_3$(Ce) detector positioned inside the polyethylene pipe [8].

The result of this modelling led to the generation of the absolute efficiency curve, which was obtained by the single points of efficiency [18] in function of the energy [17] interpolated with the 5th degree polynomial function [19], related to the position of the detector, with respect to the "cassette" system [0], containing the absolute glass fibre filter as described above.

FIG. 5 shows the absolute efficiency curve obtained from the single points of efficiency [18] in function of the energy [17] interpolated with a fifth degree polynomial function [19], in the case of a deposition probability P equal to 1 for each of the 15 circular areas present in the absolute glass fibre filter. Table 2 presents all the simulation data for the single points of efficiency [18] in function of energy [17].

TABLE 2

| absolute efficiency data [ru] [18] for individual characteristic energies [MeV] [17] | | | |
|---|---|---|---|
| Radionuclide | Energy (MeV) | Absolute efficiency [ru] | ΔAbsolute efficiency [ru] |
| Am-241 | 0.05954 | 4.770E-03 | 2.840E-04 |
| Co-57 | 0.12206 | 7.500E-03 | 9.155E-04 |
| Cs-137 | 0.66165 | 2.260E-03 | 1.495E-03 |
| Mn-54 | 0.83490 | 1.790E-03 | 1.494E-03 |
| Co-60 | 1.17322 | 1.280E-03 | 1.502E-03 |
| Co-60 | 1.33249 | 1.140E-03 | 1.519E-03 |
| Y-88 | 1.83610 | 8.297E-04 | 1.523E-03 |

The absolute efficiency curve, calculated with a particulate deposition probability P equal to 1 and in each of the 15 circular areas of the glass fibre filter, can be made functional both for the detector used as well as for the possible particulate distribution in each of the above-mentioned 15 circular areas [6] [21] and, as a result, the high volume airborne particulate sampling system can be made specific in function of the installation area/zone.

INDUSTRIAL APPLICATION

This described method can be used mainly in automatic radiological monitoring systems that operate for the purposes of radiological/nuclear early alarm, for which the state of the art does not provide the calculation of the absolute detection efficiency with respect to the probability of deposition of the particulate on the filter and, as a result, the accurate measurement of the natural and/or anthropic radionuclides in the aspirated particulate.

The radiological/nuclear early alarm can be due to the diffusion in the atmosphere of the radioactive particulate due to: a nuclear accident, for example near the national boundaries; the diffusion in the atmosphere of radioactivity due to nuclear tests performed in areas also far away from the Italian territory or, finally, the detection of airborne radioactive particulate can be associated with the improper use of nuclear material in the national territory near the automatic radiological monitoring systems.

The invention claimed is:

1. A method for calculating the absolute detection efficiency of a lanthanum bromide (LaBr3) scintillation detector with respect to a large-sized glass fiber installed in a high-volume airborne sampling system characterized in that said method is suitable to generate the absolute efficiency curve with Monte Carlo code, relative to a lanthanum bromide (LaBr3) scintillation radiation detector, with respect to 15 circular areas present in an absolute glass fibre filter interposed between an aluminum frame and an ethylene propylene diene monomer rubber layer of a cassette structure, in which sampled airborne particulate is deposited, the method includes the steps of:

a) positioning the radiation detector in a cylindrical structure, whose center is placed about 16.80 cm on an x axis, symmetrically to the right or left with respect to the central position of the absolute filter, and about 0.00 cm on a y axis with respect to the above central position of the filter, with the cylindrical structure being composed of:

a cylindrical steel container about 30.00 cm long along a z axis, external radius of about 3.81 cm and internal radius of about 3.51 cm; and a polyethylene cylindrical container threadedly connected to the cylindrical steel container to close a top thereof with the polyethylene cylinder container being about 5.45 cm long along the z axis, having an external radius of about 3.80 cm, and having an internal radius of about 3.00 cm with the distance of the upper polyethylene surface with respect to the absolute glass fibre filter being equal to about 1.13 cm along the z axis;

b) defining the particulate deposition, present in the corresponding absolute glass fibre filter fifteen circular areas, as a normalized value according to the formula:

$$z = (x - \min(x))/(\max(x) - \min(x))$$

with min(x) being representative of the minimum deposition value in the 15 circular areas of the absolute glass fibre filter, max(x) being representative of the maximum deposition value in the 15 circular areas of the above filter, x being representative of the particulate deposit value of the i-th (with i=1, 15) absolute glass fibre filter circular area and z being the normalized value of the i-th (with i=1, 15) circular area of the above filter, used for the calculation of the absolute efficiency curve; and c) calculating the radiation detector absolute efficiency curve obtained with respect to the single efficiency points in function of energy, interpolated with a polynomial function, with respect to the 15 circular areas of the absolute glass fibre filter, in which the aeriform particulate is deposited, according to:

the position of the i-th (with i=1, 15) circular area in the above filter with respect to the same radiation detector, where the i-th (with i=1, 15) circular area in which the aeriform particulate is deposited represents the i-th (with i=1, 15) source term in a relative position with respect to the center of the absolute glass fibre filter, interposed between the aluminum frame and the ethylene propylene diene monomer rubber layer of the cassette structure;

the normalized deposition of particulate z inside each i-th (with i=1, . . . , 15) circular area of the above absolute glass fibre filter; and the energy distribution of the pulses within the volume of the lanthanum bromide (LaBr3) scintillation based radiation detector being the pulses of gamma radiation generated by each i-th source term.

<div align="center">*   *   *   *   *</div>